United States Patent [19]
Lieferman et al.

[11] 3,830,473
[45] Aug. 20, 1974

[54] STARCH PASTE APPARATUS

[75] Inventors: Harry A. Lieferman; Rufus E. Ryan, both of Clinton, Iowa; James R. Piehler, Closter, N.J.

[73] Assignee: Standard Brands Incorporated, New York, N.Y.

[22] Filed: Feb. 22, 1973

[21] Appl. No.: 334,624

[52] U.S. Cl............... 259/8, 259/4, 259/67, 259/95
[51] Int. Cl............................................. B01f 7/08
[58] Field of Search............ 259/4, 5, 6, 7, 8, 95, 259/9, 10, 18, 21, 22, 23, 24, 41, 42, 43, 44

[56] References Cited
UNITED STATES PATENTS

| | | | |
|---|---|---|---|
| 3,190,618 | 6/1965 | Katzen | 259/4 |
| 3,326,815 | 6/1967 | Werner | 259/8 |
| 3,425,668 | 2/1969 | Koenig | 259/8 |
| 3,754,417 | 8/1973 | Geoffrey | 259/6 |
| 3,771,771 | 11/1973 | Deml | 259/8 |

*Primary Examiner*—Robert W. Jenkins

[57] ABSTRACT

An apparatus for continuously supplying a corrugator with a starch base adhesive. Starch, borax, caustic and other ingredients are mixed and subsequently fed through a baffle shear device to reduce viscosity of the mix. The mix is then fed to a storage tank for supply to a corrugator.

6 Claims, 6 Drawing Figures

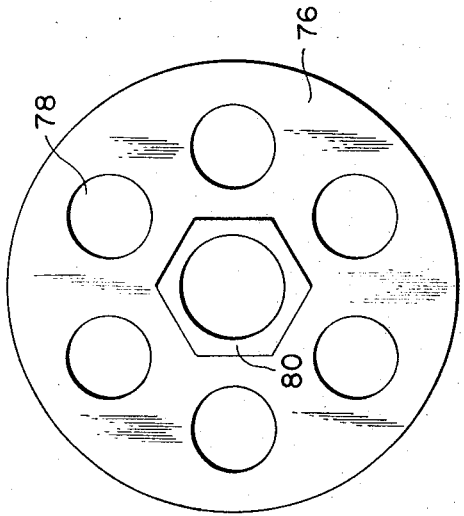
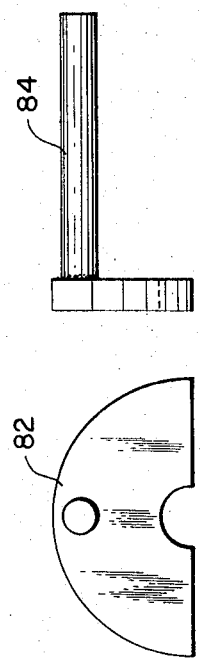
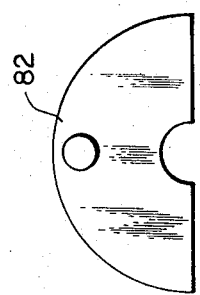
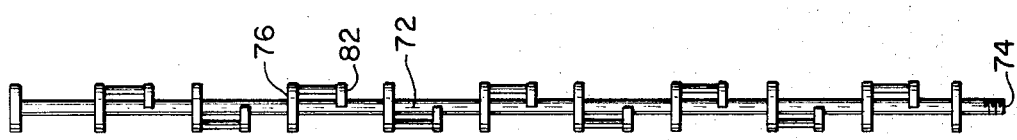
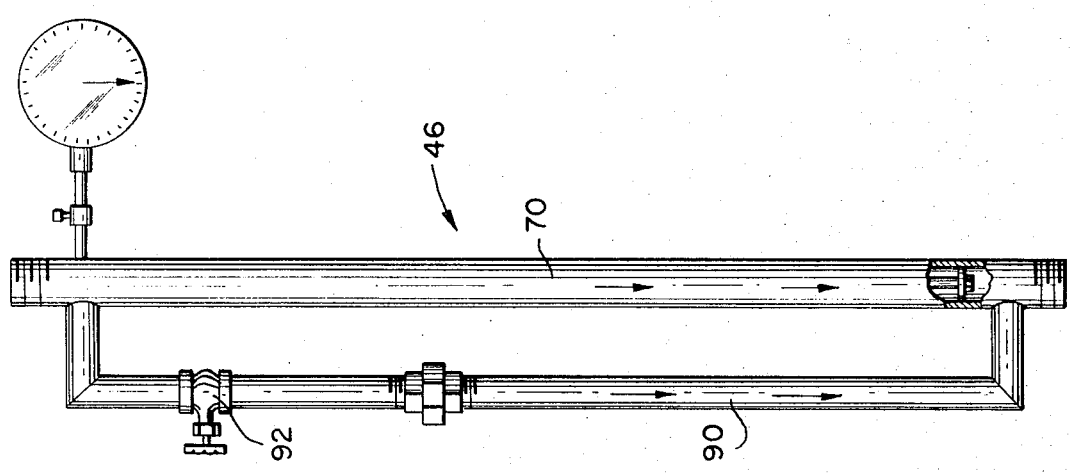

STARCH PASTE APPARATUS

This invention relates to an apparatus for making starch paste on a programmed batch basis for subsequent supply to a corrugating device. According to the process of the invention, powdered starch is mixed with water and other liquids to make a paste suitable for adhesive application. The paste is mechanically treated in order to reduce its viscosity and is then transferred to storage tanks from which it is fed directly to a corrugating apparatus of conventional construction. The practice of the invention further admits of economies in the number of chemical storage tanks employed wherein more than a single type of starch paste is employed as an adhesive base. The invention further displays utility in a novel manner of obtaining desired consistency of the starch paste prior to storage.

A corrugating adhesive consists of a suspension of starch and water at approximately 20 percent solids, plus the addition of various chemicals, each of which has its own specific use. The starch adhesive system is based on the suspension of raw or uncooked starch by the cooked starch carrier. The carrier (cooked starch portion) provides sufficient viscosity or body to allow application of the adhesive film on the tips of the flutes of the medium. Then as the combined board is subjected to heat on the corrugating machine, the uncooked starch on the flute tips gelatinize to form the adhesive bond.

The chemicals usually added are caustic (sodium hydroxide), borax and formaldehyde. The caustic is used to reduce the temperature at which the starch will gelatinize. The caustic also penetrates the cellulose walls of the fiber to make a solid anchorage for the starch adhesive. Borax body which will serve to keep the uncooked starch in suspension. It also gives the carrier enough tack so that the starch paste follows the glue rolls on the machine well and breaks easily when transferred to the flute tips. Then when the heat of the machine gels the raw starch at the flute tips, the borax takes effect and instantaneously converts the adhesive to a sticky mass. The formaldehyde is used as a preservative.

In the drawings:

FIG. 2 is a view of a viscosity reducing device defined by a baffle chamber coupled so as to recirculate a starch paste in the main mix tank.

FIG. 3 is a view of the baffle plates prior to insertion in the conduit of FIG. 2.

FIG. 4 is a view of one of two types of baffle plates.

FIG. 5 is a view of one of the other types of baffle plates.

FIG. 6 is a view taken at right angles to FIG. 5.

Figure 1:
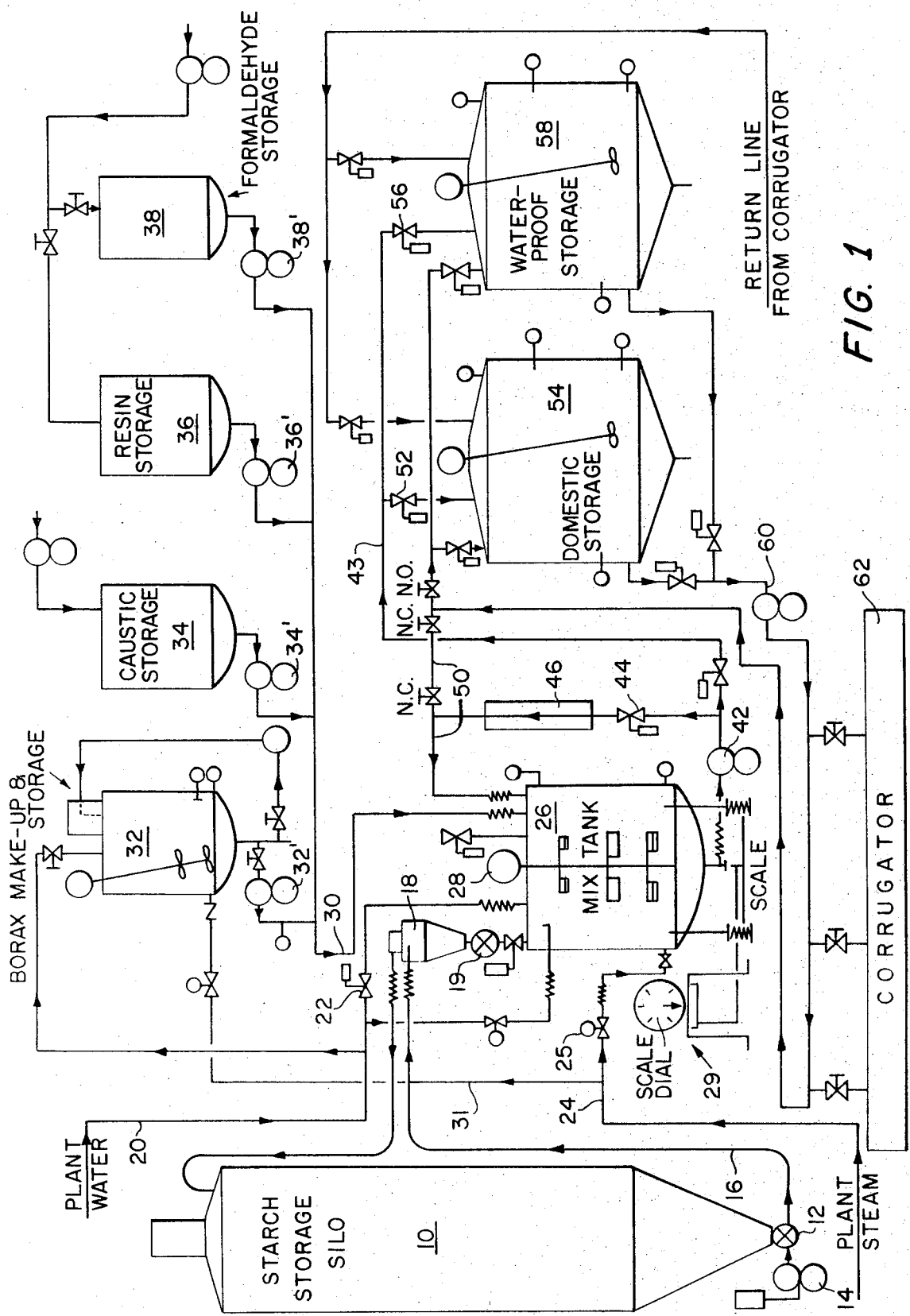
FIG. 1 is a schematic view of an automatic starch paste manufacturing apparatus and system according to the practice of this invention.

Referring now to FIG. 1 of the drawings, the numeral 10 denotes a starch storage silo which contains powdered starch. The bottom of the silo is coupled to a valve 12 one input of which is coupled to a blower 14 for discharging powdered starch from the silo through conduit 16 into a cyclone type dust collector 18. The lower portion of the cyclone 18 is provided with a valve 19, in turn coupled through a valve to mixing tank 26. Conduit 20 leads from a source of water, not illustrated, through valve 22, the latter coupled into mix tank 26. A source of steam, not illustrated, is coupled to conduit 24 for passing steam to line 31 and also through valve 25, the output of the latter passing to the lower portion of mix tank 26. A motor 28 is coupled to a plurality of vanes in mix tank 26 to rotate them. The mix tank may be supported on a scale 29 as schematically indicated for the purpose of measuring the ingredients fed to it.

The numerals 32, 34, 36, and 38 indicate storage tanks for containing the indicated ingredients, with the discharge of each storage tank provided with a pump, the latter bearing a prime designation and corresponding to each tank. Each of the indicated pumps discharges into line 30, the latter in turn coupled to the top of mixing tank 26. Alternatively the outputs from the pumps may be separately fed to the top of tank 26.

A pump 42 is placed in the output line from mixing tank 26 and passes to line 43. Valve 44 also communicated with this line and defines, along with baffle shear chamber 46 a hydraulic shunt with respect to tank 26. The output of chamber 46 passes through line 50 and then into the mixing tank. Line 43 communicates with domestic storage tank 54 and waterproof storage tank 58, through, respectively, valves 52 and 56. The output of storage tanks 54 and 58 is controlled by the indicated valves, with pump 60 causing flow of the starch paste (as will later be described) to corrugator 62.

The basic mode of operation of the illustrated system is as follows:

The starch storage silo 10 and storage tanks 32, 34, 36, 38, are filled with their indicated ingredients. Valve 22 is actuated to admit water from line 20 into mix tank 26, with the mixing vanes of the latter moved by motor 28. Powdered starch in silo 10 is added by opening valve 12 and initiating the operation of blower 14 with starch passing into conduit 16 through cyclone 18. Valve 19, open whenever valve 12 is open, permits the starch to reach the interior of tank 26. Steam from pipe 24 is admitted into tank 26 by opening valve 25. Caustic is now introduced into line 30 by the operation of pump 34' into mix tank, and liquid borax is also introduced into the tank by operation of pump 32'. Mixing now continues for approximately 15 minutes. Additional water is not added by reactuating valve 22. While the mixing is continuing in tank 26, pump 42 commences its operation with valve 44 being opened, the adjacent valves in lines 50 and 43 being closed to thereby recirculate the contents of the mix tank by way of hydraulic shunt which includes the baffle shear 46. Additional starch is added after which the mixing in tank 26 again occurs for approximately 15 minutes. Liquid borax from tank 32 is added, as previously, and also formaldehyde from tank 38 is added. The complete mixing time continues until the desired viscosity of the starch paste in tank 26 is attained. Valve 44 is now closed while the adjacent valve in line 43 is open, after which pump 42 again operates to feed the mix to supply tank 54 through line 43.

In the event that waterproof starch paste is to be made, the above steps are followed, with the addition that resin from tank 36 is also added through line 30 into mix tank 26. After mixing is completed, the waterproof starch paste is pumped through line 43 and valve 56 into storage tank 58.

To complete the cycle of steps, pump 60 is operated to thereby force the paste from tank 54, or the paste from tank 58, to corrugator 62, the latter determination controlled by the operation of the indicated valves slightly upstream of pump 60.

Referring now to FIGS. 2 through 6, the description will now be given of the baffle shear chamber 46 and its function. In FIG. 2, the numeral 70 denotes a tubular conduit which contains a series of baffle plates to be described. In certain instances, a bypass conduit 90 may be provided around the baffle plate in conduit 70 and is controlled by the operation of the indicated valve 92. Referring now to FIGS. 3 through 6, the numeral 72 denotes essentially extending rods having threads 74 at one end thereof and a plurality of baffle plates 76 and 82. Each of the baffle plates 76, shown in FIG. 4 defines one set of baffle plates, while the remaining baffle plates 82, show that FIGS. 5 and 6, define a second set. The reader will observe that the first and second sets of baffle plates are dispersed so that they occupy alternate longitudinal positions along the axis of rod 72. As shown in FIG. 4, the endmost baffle plate 76 bears against a nut 80, the latter screwed on threads 74. In practice, baffle plates 76 and 82 are welded to rod 72. As shown at FIG. 6, spacer rods 84 extend between the first and second sets of baffle plates to maintain their actual spacing.

In operation, the hydraulic fluid defined by starch paste passes from valve 44 (when open) into conduit 70 and passes through angularly spaced openings 78 of baffle plates 76. This is the only passage through these baffle plates because the peripheries of plates 76 are in contact with the interior walls of conduit 70. The starch paste flow continues and a portion thereof directly strikes baffle plates 82 while another portion continues on to the next full baffle plate 76. As seen in FIG. 3 of the drawings, the baffle plates 82 are of approximately one half of a circle in angular extent and occupy alternate positions along rod 72. The function of baffle plates 76 and 82 is to define a serpentine path for the starch paste to thereby reduce its viscosity by repeated changes in direction as it passes along the tube 70. In certain instances the bypass conduit 90 may be opened so that only a portion of the recirculated starch paste is treated by the shear baffle plates.

What is claimed is:

1. A baffle shear construction adapted to reduce viscosity of starch suspensions, including
   a. a tubular conduit,
   b. an elongated center rod having a plurality of baffle plates axially spaced along said rod,
   c. a first set of said baffles defined by discs having angularly spaced apertures therethrough and a central aperture receiving said center rod, peripheral portions of said baffles engaging the interior of said conduit,
   d. a second set of said baffles defined by disc sectors, secured to and alternating along said center rod and lying in planes at right angles to said rod, said second set of baffles carrying stiffener rods parallel to said center rod and extending between the baffles of the first and second sets.

2. The baffle shear construction of claim 1 wherein the disc sectors of said second set have an outermost radius equal to that of the discs of the first set.

3. The baffle shear construction of claim 2, including,
   a. a mixing tank having an agitator therein, said tank also having a fluid inlet at an upper portion thereof and a fluid outlet at a lower portion thereof,
   b. one end of said tubular conduit coupled to said upper tank inlet and the other end of said tubular conduit coupled to said lower tank outlet,
   c. a fluid pump in series with said tubular conduit,
   d. whereby an amylaceous slurry in the mixing tank may be continuously cycled through the baffles in the tubular conduit to reduce its viscosity, 4. An apparatus for producing starch based adhesives for corrugated paper manufactures, on a programmed batch basis, including, a main storage silo for storing powdered starch, a mixing tank having an upper inlet thereof in communication with said storage silo, a first plurality of other storage silos, said other silos having their outlets coupled to an upper portion of said mixing tank, a second plurality of storage silos, said second plurality coupled to a lower outlet of said main mixing tank, the improvement comprising.
   a. a hydraulic shunt between the lower and upper portions of said mixing tank, said shunt having a pump in series therewith, said shunt having means therein for reducing the viscosity of a starch paste passing therethrough.

5. The apparatus of claim 4 wherein said viscosity reducing means is defined by a conduit having a plurality of planar baffle plates spaced interiorly therealong, the baffle plates defining a serpentine fluid path through the conduit.

6. The apparatus of claim 5 wherein said baffle plates are defined by two sets of discs, alternately spaced along and supported by a main rod extending centrally through said conduit, the discs of said two sets alternating, the discs of one set being circular and having apertures therethrough and having their periperies in contact with the interior of said tubular conduit, the discs of the other set being of lesser circumferential extent than those of said first set.

* * * * *

UNITED STATES PATENT OFFICE
CERTIFICATE OF CORRECTION

Patent No. 3,830,473     Dated August 20, 1974

Inventor(s) Harry A. Lieferman, Rufus E. Ryan and James R. Piehler

It is certified that error appears in the above-identified patent and that said Letters Patent are hereby corrected as shown below:

Column 1, line 35; sentence beginning with "Borax" should read --Borax is added to give the cooked starch paste a heavy (thick), short body which will serve to keep the uncooked starch in suspension--.

Column 1, line 49; "couplied" should read --coupled--.

Column 1, line 62; "sile" should read --silo--.

Column 2, line 45; "not" should read --now--.

Column 4, line 49; "periperies" should read --peripheries--.

Signed and sealed this 10th day of December 1974.

(SEAL)
Attest:

McCOY M. GIBSON JR.
Attesting Officer

C. MARSHALL DANN
Commissioner of Patents